Feb. 6, 1962     D. J. MacGREGOR     3,020,463
SYNCHRONOUS MOTOR CONTROL
Filed May 7, 1959     3 Sheets-Sheet 1

WITNESSES

INVENTOR
Dean J. MacGregor
BY
ATTORNEY

Feb. 6, 1962   D. J. MacGREGOR   3,020,463
SYNCHRONOUS MOTOR CONTROL
Filed May 7, 1959   3 Sheets-Sheet 2

United States Patent Office 3,020,463
Patented Feb. 6, 1962

3,020,463
SYNCHRONOUS MOTOR CONTROL
Dean J. MacGregor, Amherst, N.Y., assignor to Westinghouse Electric Corporation, East Pittsburgh, Pa., a corporation of Pennsylvania
Filed May 7, 1959, Ser. No. 811,615
17 Claims. (Cl. 318—175)

This invention relates to synchronous motor controls and more particularly to a system of control for synchronizing the motor when it accelerates to a proper speed.

Conventional starting control systems for synchronizing a synchronous motor utilize electro-mechanical relay devices which have many disadvantages. The relay is subject to variations in its performance due to vibration, shock or contaminated atmospheres. Considerable mounting space is required for electro-mechanical relays, which space is quite often at a premium. The rate of response of the conventional synchronizing system for motor starting is quite often inadequate to satisfactorily synchronize the motor. There are a great many mechanical and production difficulties inherent in the electromagnetically operated devices conventionally used in synchronous motor starters. In addition, excessive tooling costs are necessary to manufacture the conventional control devices and this can add greatly to the cost of the starting equipment.

One object of the invention is to provide a system of starting controls for a synchronous motor having a synchronizing system which is compact, light in weight, and reliable through the use of static devices requiring little or no maintenance.

Another object of this invention is to provide a system of controls for a synchronous motor having a new and improved synchronizing circuit responsive to the frequency and polarity of the current induced in the motor field.

Another object of this invention is to provide a synchronizing scheme for a synchronous motor control system which is independent of the magnitude or waveform of the current induced in the field winding.

Another object of this invention is to provide a synchronizing scheme for a synchronous motor control system utilizing static elements permitting finer adjustment, improved reliability and sensitivity, and considerably less space than conventional synchronizing schemes.

Another object of this invention is to provide a synchronizing scheme for a synchronous motor which can be adjusted to respond over a speed range below synchronous speed.

Another object of this invention is to provide a synchronizing scheme for a synchronous motor start-up which is capable of determining and functioning at the optimum conditions for applying excitation to the synchronous motor.

Another object of this invention is to provide a synchronizing scheme for a synchronous motor capable of sensing synchronization of the motor should synchronization occur prior to application of excitation to the field winding.

Further objects and advantages of my invention will be readily apparent from the following detailed description taken in conjunction with the accompanying drawings, in which:

FIG. 4 is an oscillographic representation of the terminal voltage of the field winding during starting with the amplitude of the voltage greatly reduced while

Figure 1:
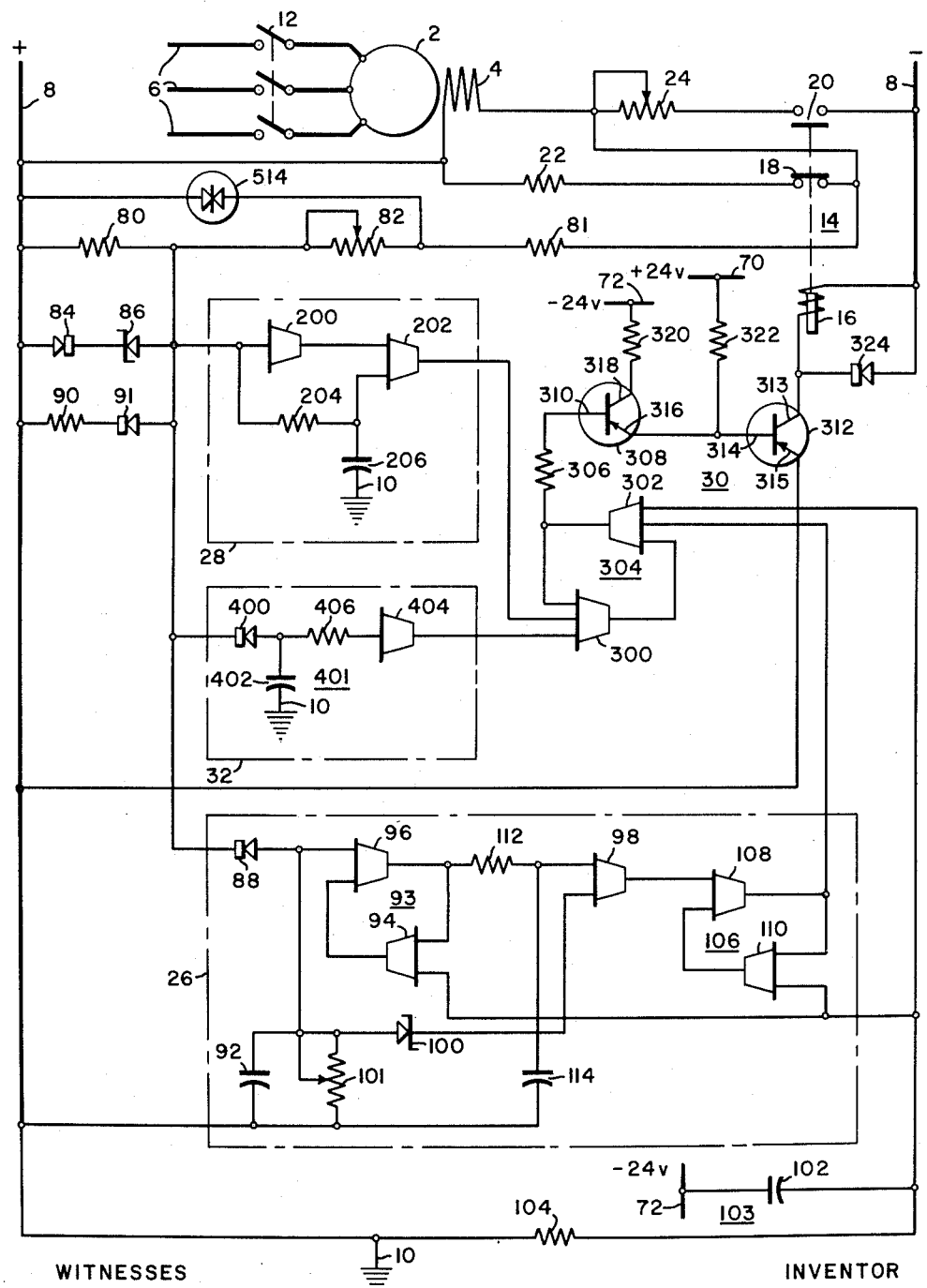
FIGURE 1 is a schematic diagram of an illustrative embodiment of my invention.

The invention is shown embodied in an electrical control system for a synchronous motor 2 having a field winding 4. The alternating current power supply is indicated by the power supply leads 6 while the direct current supply is represented by leads 8. The leads 8 are illustrated to have a polarity as shown in the drawing with the positive lead connected to ground 10. The synchronous motor 2 is started by energizing its stator by means of closing the line contactors 12 to the alternating current power supply 6. At the same time the field winding 4 is short-circuited through a discharge resistor 22 by means of a field contactor 14 having an operating coil 16 and a normally closed contact 18, as well as a normally opened contact 20. Amortisseur starting windings on the rotor (not shown) combine with the short-circuited field winding 4 to give the effect of a squirrel cage motor resulting in acceleration of the rotor as a conventional alternating current induction machine. When the motor reaches the desired speed for synchronism the operating coil 16 of the field contactor 14 is energized. The normally opened contact 20 will close thereby connecting the direct current excitation to the field winding 4 while the opening of the normally closed contact 18, an instant after the closure of contacts 20, removes the short-circuit connection on the field winding 4. In such a manner the synchronous motor is pulled into step and operates at synchronous speed. A field control rheostat 24 is connected in series with the field winding 4 to control excitation to the field winding. This completes the conventional arrangement for the starting control of the synchronous motor 2.

The present invention utilizes static circuitry and logic elements which allow a precise selection and sensing of the optimum conditions for the application of excitation to the field winding 4. In accordance with this invention, the syncronizing scheme utilized is shown as including several parts: a speed sensing circuit 26, a polarity sensing circuit 28, an amplifier and power switching circuit shown generally at 30, and a pull-in sensing circuit 32.

The speed sensing circuit 26, the polarity sensing circuit 28, and the pull-in sensing circuit 32 are connected to respond to the current induced in the field winding 4 during start-up and provide input signals of the amplifier and power switching circuit 30. Upon occurrence of the proper relation of the input signals to the rotor position, the amplifier and power switching circuit 30 switches "on" thereby actuating the field contactor 14. Should the motor synchronize before the polarity sensing circuit 28 responds, the pull-in sensing circuit 32 will provide an input signal to replace the signal from the polarity sensing circuit 28 in initiating the switching circuit 30.

Figure 2:
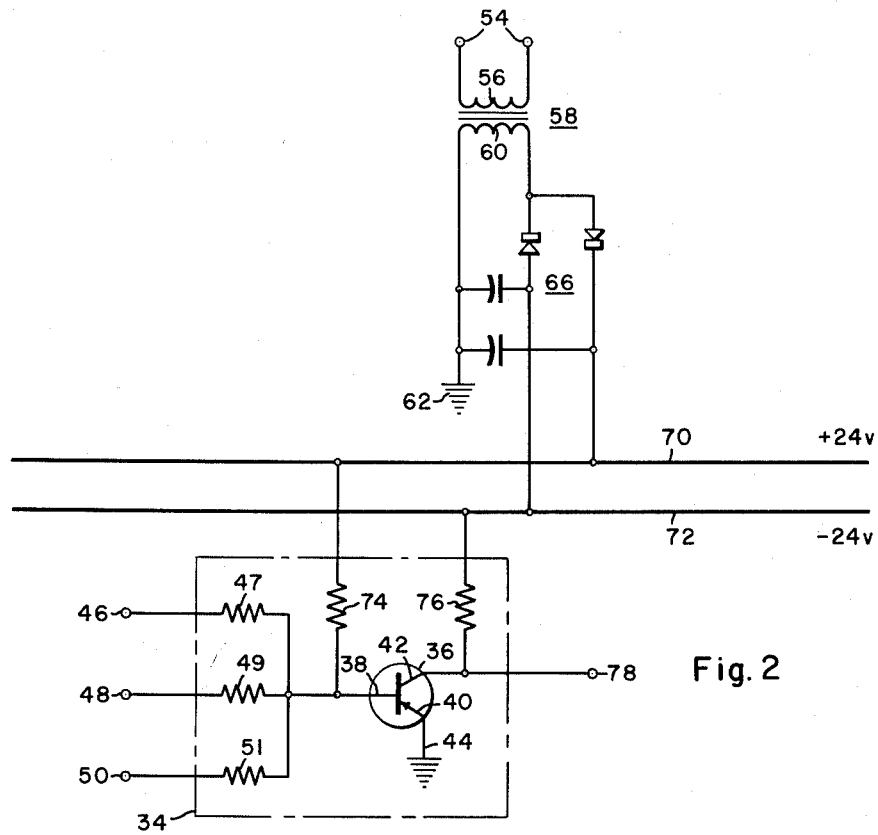
FIG. 2 illustrates a typical circuit element and its power supply which may be utilized to perform the logic function used in this invention.

Each of these circuits utilize a NOR element or a MEMORY element, or both. Two NOR elements are appropriately connected to form a FLIP-FLOP or MEMORY element. One such form of NOR element and one such form of MEMORY element are shown in an article entitled, "Static Switching Devices," by Robert A. Mathias, in "Control Engineering," May 1957. Of course, any suitable form of NOR element or MEMORY element may be used. For purposes of clarity, FIG. 2 is provided to illustrate a typical NOR element indicated at 34. The NOR element 34 comprises a transistor of suitable type herein shown as a PNP type and indicated by the reference character 36. The transistor 36 has a base electrode 38, an emitter electrode 40 and a collector electrode 42. The emitter electrode 40 is shown connected to ground potential indicated at 44. The base electrode 38 is connected to a plurality of input terminals 46, 48, and 50 through their respective isolating impedances 47, 49, and 51. Any number of input terminals and isolating impedances may be used. A biasing potential is provided for the NOR element 34 by means of a source of alternating current supply indicated at 54. The alternating current supply leads 54 are connected to the primary winding 56 of a single phase transformer 58 having one side of its secondary winding 60 grounded at 62. The output from the secondary 60 is connected to rectifying and filtering means indicated at 66 arranged to provide a positive potential, indicated as +24 volts, to a bus bar 70 while a negative potential, shown as −24 volts, is applied to a second bus bar indicated at 72. A biasing resistor 74 connects the base electrode 38 to the positive potential bus bar 70 while a current limiting resistor 76 connects the collector electrode 42 to the negative bus bar 72. The collector electrode 42 is also connected to an output terminal 78.

In operation, the positive bus bar 70 biases the transistor 36 to cut off through the resistor 74. If no signal is present at the input terminals 46, 48, 50, the transistor 36 is non-conductive and an output will appear at the terminal 78 which will be approximately the value of the potential of the negative bus bar 72. If a negative potential signal is supplied to one or more of the input terminals, the transistor 36 becomes highly conductive, simulating a switch in the closed position, and effectively grounding the output terminal 78 so there will be no output at the terminal 78.

The FLIP-FLOP, or MEMORY element, utilized in my invention is constructed by the cross-connection of the outputs and inputs of two NOR elements. The resulting MEMORY element is a bistable device which is capable of being triggered to assume one state and remain in that state even after removal of the triggering influence. The MEMORY element will assume its opposite state when a second input is applied to it and will remain in the second state even after removal of the second input.

Figure 4:
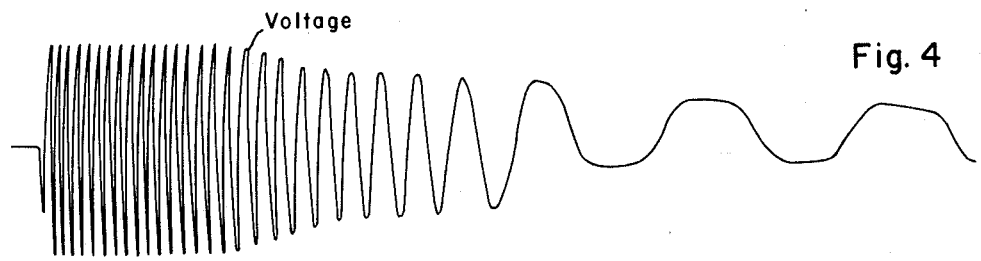
Figure 4A:
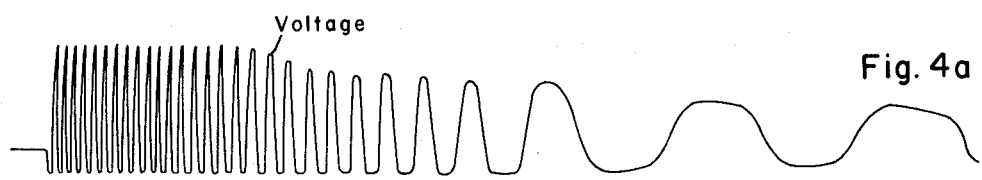
FIG. 4a shows the resultant voltage clipping action utilized in my invention.

As stated previously, the circuits 26, 28 and 32 are connected to respond to the current induced in the field winding 4 during starting. To obtain an accurate measure of the induced alternating field current a voltage adjusting potentiometer 82 and voltage dropping resistors 80 and 81 are connected in electrical series connection across the field winding 4. The induced alternating field current provides a signal voltage across the resistor 80 which is in phase with the induced current. The resistor 80 and potentiometer 82 allow adjustment of the magnitude of voltage appearing across a rectifier 84 and a Zener diode 86, connected back-to-back in electrical oppositon across the dropping resistor 80. It will be understood that a Zener diode is a semi-conductor rectifier, usually a silicon diode, which has the characteristic of blocking current flow in one direction when the voltage is below a predetermined breakdown value while current is permitted to flow freely when the voltage is above a predetermined value. The breakdown is non-destructive so the current is cut off when the voltage again drops below the breakdown value. Of course, any device with a breakdown region as described can be used. The Zener diode 86 clips the negative half of the voltage wave across the resistor 80 during starting and makes the sensed voltage signal independent of the machine voltage or waveform. The rectifier 84 blocks the positive half cycles thereby protecting the Zener diode 86 from excessive forward current. The clipping action can be more readily seen by referring to FIG. 4 and 4a. FIG. 4 is an oscillographic representation of the terminal voltage of the field winding 4 during a normal start-up of the motor. FIG. 4a is an oscillographic representation of the voltage across the rectifier 84 and Zener diode 86 showing how the voltage to be sensed is independent of the machine voltage and waveform. The amplitude of the clipped voltage in FIG. 4a has been greatly increased in proportion to the amplitude of the terminal voltage for purposes of clarity.

The speed sensing circuit 26 determines when the speed of the motor is proper for synchronizing by measuring the frequency of the induced alternating current. The frequency of the induced current varies as the motor slips and thus decreases as the synchronous motor accelerates.

The speed sensing circuit 26 is connected across the rectifier 84 and the Zener diode 86 by means of a rectifier 88 which allows only negative half cycles of the clipped signal voltage to enter the speed sensing circuit 26. A resistor 90 and rectifier 91 are connected electrically in series and across the rectifier 84 and the Zener diode 86 to load the positive half cycles of the signal voltage to balance the load presented by the sensing circuits 26 and 32 during the negative half cycles thereby avoiding high positive voltage peaks in the control system.

The speed sensing circuit 26 has a MEMORY element 93 formed by interconnecting a NOR element 94 and a NOR element 96. A second MEMORY element 106 is formed in the same manner by NOR elements 108 and 110. The output of the first MEMORY element 93 is coupled to the input of the second MEMORY element 106 by a NOR element 98.

A pulse network 103 is provided to switch the MEMORY elements to their proper initial state before start-up. A capacitor 102 is connected in series with a limiting resistor 104 betwen the negative bus bar 72 and ground 10. When the negative bus bar 72 is energized prior to energization of the motor, the capacitor 102 charges through resistor 104 and the resulting negative voltage constitutes an input pulse to the MEMORY element 93 turning it "on" by pulsing an input to the NOR element 94. MEMORY element 106 is switched "on" in a similar manner.

The MEMORY element 93 prevents MEMORY element 106 from reversing its state before the motor has started. The output from the MEMORY element 93 blocks an output from the NOR element 98 until the initial pulse of negative signal voltage resulting from the induced current in the field winding switches the MEMORY element 93 off. A resistor 112 in series with a capacitor 114 are connected to receive the output from the MEMORY element 93 to ground 10. The resistor 112 and capacitor 114 form a time delay network which has its circuit parameters selected to maintain an input to the NOR element 98 until a capacitor 92 has been charged to a value sufficiently high to cause an input to the NOR element 98. During start-up the capacitor 92, in electrical series connection between the rectifier 88 and ground 10, is quickly charged to the peak value of the negative clipped signal voltage. A potentiometer 101 across the capacitor 92, allows adjustment of the discharge rate of the capacitor 92. During the positive half cycles of the signal voltage, the capacitor 92 discharges through the NOR element 96, the NOR element 98, and potentiometer 101. A Zener diode 100 is connected between the capacitor 92 and the NOR element 98. The parameters of the capacitor 92, potentiometer 101 and the NOR elements 96 and 98 are chosen so that the voltage on the capacitor 92 remains above the breakdown voltage of Zener diode 100 and constitutes an input signal to NOR element 98 as long as the frequency of the induced current in field winding 4 is greater than a predetermined value. When the length of a half cycle of the induced current exceeds the discharge time, the voltage across the capacitor 92 will drop below the breakdown voltage of the Zener diode 100 and the input to the NOR element 98 is cutoff. Thus, it can be seen that there is no output from the NOR element 98 until the motor has started and accelerated to the preselected speed. When an output results from the NOR element 98 the MEMORY element 106 will be switched off so that no signal will result to the amplifier and power switching circuit 30 hereinafter described.

Figure 3:
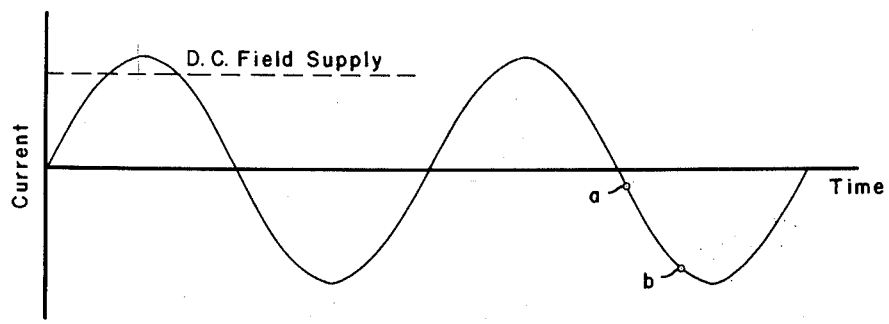
FIG. 3 is an oscillographic representation illustrating the optimum range for synchronization.

To minimize switching transients upon application of the excitation to the field winding, the excitation must be applied during the proper magnitude and polarity of the induced current in the field winding. It is well known that if the excitation is applied during the early part of the negative half cycle of the induced current (assuming the D.C. excitation to be positive), the positive torque developed by the motor will accelerate the motor while the excitation voltage will force the field current to zero at a quicker pace. This action eliminates or reduces the area of negative or generator torque. During the positive half cycle, the motor system has time to dampen the electrical and mechanical transients which occur and the full excitation current is available to produce a maximum pull-in torque as the poles approach their synchronized position during the first half of the positive wave. This can be more clearly seen from FIG. 3 which is an oscillographic representation of the current induced in the field winding with respect to time. The direct current field supply has been indicated to be of positive polarity as shown by the dotted line. The optimum region for application of the excitation of the field winding is located between the reference points (a) and (b) located in the first half of the negative half wave of the induced current in the field winding. The optimum time for switching is between the points (a) and (b) as determined by test and suggested in published literature well known in the art. If the direct current field excitation is negative, the optimum region for application of the excitation would be similarly located but in the positive half cycle of the induced current in the field winding.

In accordance with my invention the polarity sensing circuit 28 is provided with a NOR element 202 connected to receive the output from a NOR element 200. The NOR element 200 is chosen to require an input of at least a few volts of negative potential input before it switches "off." It has been shown that it is desirable that the NOR element 202 have an output to the amplifier and power switching circuit 30 only during a brief interval at the beginning of the negative half cycle. The NOR element 200 is connected to receive as an input the clipped alternating signal voltage resulting from the rectifier 84 and the Zener diode 86. During the positive half cycle of the signal voltage the NOR element 200 provides NOR element 202 with an input, hence no output from NOR element 202 can result. During the negative half cycle, NOR element 200 provides no input to NOR element 202 hence an output could result from the NOR element 202 throughout each negative half cycle. However, the most advantageous time for synchronizing is when the induced current is rising to its negative maximum as outlined previously. Therefore, a resistor 204 and capacitor 206, connected in series to ground 10, form a time delay network such that shortly after the appearance of the negative half of the induced current the capacitor 206 is sufficiently charged to constitute an input to the NOR element 202 switching it off. Thus, an output from the NOR element 202 is obtained only during the charging interval of the capacitor 206. The short duration output prior to the time required to charge the capacitor 206, indicates the optimum polarity condition for applying excitation to the field winding.

The amplifier and power switching circuit 30 is adapted to receive the output signal from the speed sensing circuit 26 and polarity sensing circuit 28. Upon coincident receipt of each of the signals, the amplifier and power switching circuit 30 provides an output which actuates the field contactor 14. Receipt of the signals is accomplished by a NOR element 300 and a second NOR element 302 connected to form a MEMORY element 304. The MEMORY element 304 is initially switched to its "off" position when the power supply is energized by the same pulsing circuit 103 used to pulse the MEMORY elements 93 and 106 to their proper initial position.

While the synchronous motor is accelerating, an input to the NOR element 300 appears periodically from the polarity sensing circuit 28. However, the presence of a signal on an input terminal to the NOR element 302 from the speed sensing circuit 26 prevents the MEMORY element 304 from switching "on" with a resultant output therefrom. When the desired speed for synchronization is attained, both inputs to the NOR element 302 are zero so that the next signal from the polarity sensing circuit 28 to the NOR element 300 will cause the MEMORY element 304 to switch to an output signal. This output signal is applied through an isolating resistor 306 to a first amplifying transistor 308 through its base electrode 310. In addition, the transistor 308 has a collector electrode 318 and emitter electrode 316. The collector electrode 318 is energized through a load resistor 320 connected to the negative bus 72.

A power transistor 312 is connected with its base electrode 314 connected to the emitter electrode 316 of the transistor 308. The second transistor 312 also has a collector electrode 313 and an emitter electrode 315. The base electrode 314 is positively biased through a resistor 322 connected to the positive bus 70.

When an input signal appears at the base electrode 310 from the MEMORY element 304 the transistor 308 is made conductive, simulating a switch in the closed position, thereby drawing current from the base electrode 314 of the power transistor 312. The power transistor 312 becomes conductive and simulates a switch in the closed position with the result that the operating coil 16 of the field contactor 14 is energized by the excitation voltage across the excitation leads 8 causing the contactor 14 to operate, thereby closing the normally open contacts 20 and an instant later opening the normally closed contacts 18. In such a manner direct current excitation is applied to the field winding 4. A rectifier 324 is connected in parallel with the operating coil 16 of the relay 14 to protect the power transistor 312 from excessive switching surges that may occur when the power transistor 312 becomes non-conductive.

Figure 5:
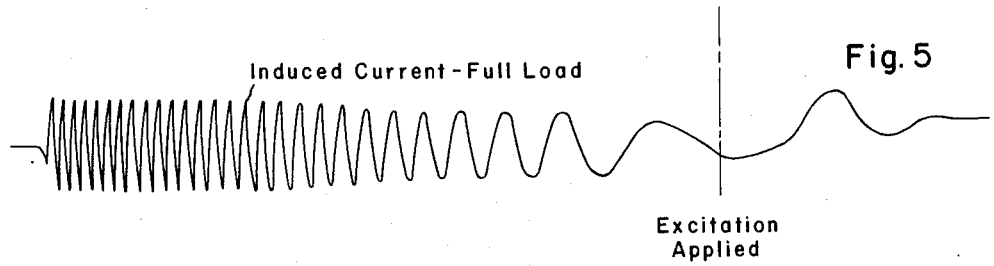
FIG. 5 is an oscillographic representation of the current induced in the field winding of the synchronous motor under full-load starting conditions.

It is well known that a lightly loaded synchronous motor may pull into step before the field excitation is applied. Synchronization under these circumstances can result due to reluctance torque which can cause the rotor to attain its correct angular position relative to the stator field prior to the excitation being applied to the field winding. This condition can be readily seen by a comparison of FIG. 5 and FIG. 6. When the synchronous motor is started under full load conditions, the current induced in the field winding has a frequency which steadily diminishes with the slip of the synchronous motor. When the time between negative half pulses of the induced current in the field winding is greater than the time established in the speed sensing circuit 26 and when the polarity of the induced voltage is of proper reference as determined by the polarity sensing circuit 28, the field contactor 14 will be energized to close as indicated by the dot-dash line in FIG. 5.

Figure 6:
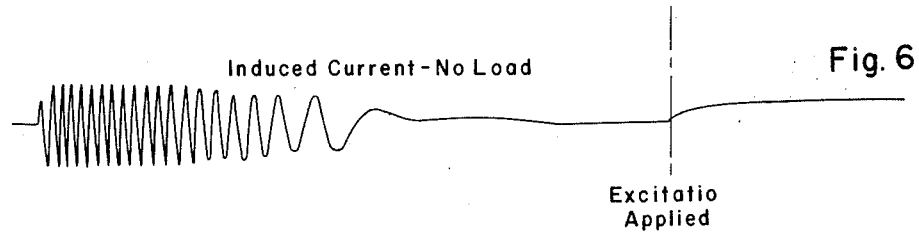
FIG. 6 is an oscillographic representation of the current induced in the field winding during starting of a synchronous motor under no-load conditions.

However, when the synchronous motor is started with a no-load condition, it will be seen from FIG. 6 that the induced field current and voltage rapidly approach a steady state value. In fact, the last positive half cycle may be too short in duration to allow switching of the speed sensing circuit 26. This circuit then switches (indicating the motor has accelerated to synchronizing speed) after the induced voltage has become zero. Since there is no longer any input to the polarity sensing circuit 28 it can have no output. To allow application of the field excitation under such a condition, the polarity sensing circuit 28 must be bypassed and another signal provided in its place to actuate the amplifier and power switching circuit 30.

Therefore, in accordance with this invention a pull-in sensing circuit 32 has been provided that will supply a signal to the amplifier and power switching circuit 30 should the motor synchronize prior to application of the field excitation. The pull-in sensing circuit 32 contains a time delay network 401 which allows the pull-in sensing circuit 32 to supply a signal to the circuit 30 if the induced current in the field winding is zero. The time delay network 401 is selected to have a greater time delay than the one-half cycle length of the induced current encountered under any condition so that the circuit 32 never has an output if the motor is still slipping poles. To this end, a rectifier 400 is connected to allow only negative half cycles of the signal voltage to the pull-in sensing circuit 32. The negative half cycles of the clipped signal voltage from the rectifier 84 and the Zener diode 86 charge the capacitor 402 which is connected to ground 10 on its opposite side. The negative half cycle of the clipped voltage also constitutes an input to a NOR element 404 through a resistor 406 thereby blocking any output from the NOR element 404. The capacitor 402 discharges through the resistor 406 and NOR element 404, but the time delay circuit parameters are selected such that the voltage across the capacitor remains of sufficient magnitude to continue blocking the NOR element 404 through the longest half cycle of positive signal voltage that will be encountered. If, however, the synchronous motor pulls into step, the capacitor 402 will discharge and the input to the NOR element 404 will be removed. The resultant output from the NOR element 404 is then supplied to the NOR element 300 in the amplifier and power switching circuit 30. The output from the NOR element 404 thereby replaces the signal from the polarity sensing circuit 28 in initiating application of the excitation to the field winding.

This invention provides a synchronizing scheme for a starting control circuit which is capable of quickly responding to the optimum point of application of excitation to the motor field. Synchronizing transients are thereby kept to a minimum.

Occasionally large switching surges, as may occur during transient fault conditions on the power supply lines 6, may appear across the field winding 4. To protect the sensing circuits from these surges a non-linear resistor 514 is connected across the resistor 80 and potentiometer 82. It is to be understood that a non-linear resistor has the characteristic of drawing more than a proportional amount of current as the voltage across it increases. In other words, the non-linear resistor 514 becomes highly conductive upon the occurrence of high voltage surges thus causing the entire high potential surge to appear across the resistor 81 and in this manner protect the sensing circuits from damaging high potential surges.

This invention is independent of the magnitude of machine voltage of its waveform. The synchronizing circuit can be adjusted to vary the speed at which the field winding is to be energized. At the same time, should synchronization result due to the reluctance torque, a means has been provided to nevertheless initiate the application of the excitation voltage to the field winding 4. Improved reliability and sensitivity are obtained by the static devices and their arrangement. Less space is required than with the conventional electro-mechanical relay systems.

The synchronizing scheme provided by the present invention allows a finer adjustment of the critical values necessary for a smooth synchronization of the motor, while at the same time improving a reliability and sensitivity.

Various modifications are possible within the spirit and scope of this invention. Static control means capable of interrupting and switching the excitation voltage may be employed in place of the field contactor 14. Logic elements of the NOR type have been shown, but it is to be understood that other logic elements may be used to accomplish the same results. The transistors have been illustrated to be of the PNP type but NPN transistors may be used with suitable changes in polarity. These alterations and substitutions are merely by way of example. Although a particular embodiment of the invention has been shown for the purpose of illustration, it is to be understood that the invention is not limited to the specific arrangement shown, but includes all equivalent embodiments, modifications and substitutions within the spirit and scope of this invention.

I claim as my invention:

1. In a control system for a synchronous alternating current motor having a field winding adapted to be connected to an excitation source comprising, in combination, a resistance element, means arranged to short-circuit the field winding through said resistance element when the motor is starting, a speed sensing device operably connected to said field winding and providing a signal in accordance with the frequency of the induced current in the field winding, a polarity sensing device operably connected to said field winding and providing a second signal during a brief interval of the midpoint region of the first half of the opposite polarity half cycle of said induced current compared to the polarity of said excitation source, a pull-in sensing device operably connected to said field winding and providing a third signal in the absence of said second signal from said polarity sensing device after a predetermined time period, and means responsive to the simultaneous occurrence of either the first and second signal or the first and third signal for opening the short circuit through said resistance element of the field winding and thereafter connecting said field winding to the excitation source.

2. In a control system for a synchronous alternating current motor having a field winding adapted to be connected to an excitation source of a predetermined polarity comprising, in combination, a speed sensing device operably connected to said field winding and providing a signal in accordance with the frequency of the induced current in the field winding, a polarity sensing device operably connected to said field winding and providing a second signal during the intermediate region of the first half of the half cycle of said induced current of polarity opposite to the excitation source applied to the field winding, a pull-in sensing device operably connected to said field winding and providing a third signal in the absence of a second signal from said polarity sensing device after a predetermined time delay, and means responsive to the simultaneous occurrence of either the first and second signal or the first and third signal for connecting said field winding to the excitation source.

3. In a control system for a synchronous alternating current motor having a field winding adapted to be connected to an excitation source of predetermined polarity, a MEMORY element having an output dependent on a proper combination of inputs supplied to the MEMORY element, first input means for deriving a first input representative of the desired frequency of the induced alternating current output of the field winding; second input means for deriving a second input representative of a predetermined portion of the cycle of the induced alternating current output; third input means for deriving a third input upon the induced alternating current output being reduced substantially to zero, the proper combination of inputs being the first input with the second input or the first input with the third input, and switching means responsive to the output of said MEMORY element for connecting said field winding to the excitation source.

4. In a control system for a synchronous alternating current motor having a field winding adapted to be connected to an excitation source of predetermined polarity, a MEMORY element having an output dependent on a proper combination of inputs supplied to the MEMORY element, first input means for deriving a first input representative of the desired frequency of the induced alternating current output of the field winding, second input means for deriving a second input representative of a predetermined portion of the cycle of the induced alternating current output; third input means for deriving a third input upon the induced alternating current output being reduced substantially to zero, time delay means connected for energization by the induced output for blocking the application of said third input for a predetermined length of time, the proper combination of inputs being the first input with the second input or the first input with the third input, and switching means responsive to the output of said MEMORY element for connecting said field winding to the excitation source.

5. In a control system for a synchronous alternating current motor having a field winding adapted to be connected to an excitation source of predetermined polarity, a MEMORY element having an output dependent on a proper combination of inputs supplied to the MEMORY element, first input means for deriving a first input representative of the desired frequency of the induced alternating current output of the field winding; second input means for deriving a second input representative of a predetermined portion of the cycle of the induced alternating current output; third input means for deriving a third input upon the induced alternating current output being reduced substantially to zero, time delay means connected for energization by the induced output for blocking the application of said third input for the longest half cycle of the induced output encountered during start-up, the proper combination of inputs being the first input with the second input or the first input with the third input, and switching means responsive to the output of said MEMORY element for connecting said field winding to the excitation source.

6. In a control system for a synchronous alternating current motor having a field winding adapted to be connected to an excitation source of predetermined polarity, a MEMORY element having two output states, a reset means, and at least a first and a second input means, said MEMORY element switching its output state upon the simultaneous occurrence of an actuating signal to said second input means and the absence of an actuating signal to said first input means, a first NOR element operably connected to said field winding and providing an actuating signal to said first input means during each half cycle of the induced voltage in the field winding of opposite polarity to said predetermined polarity, time delay means connected to be charged by each half cycle of opposite polarity to said predetermined polarity and having a decay time sufficient to keep an input signal to the first NOR element during each half cycle of said predetermined polarity until the frequency of the induced current diminishes to a predetermined value, a second NOR element operably connected to said field winding providing an actuating signal to said second input means only during the intermediate region of the first half of the half cycle of induced current of opposite polarity to said predetermined polarity, and switching means responsive to the switching of output state by said MEMORY element for connecting said field winding to the excitation source.

7. In a control system for a synchronous alternating current motor having a field winding adapted to be connected to an excitation source of predetermined polarity, a MEMORY element having two output states, a reset means, and at least a first and second input means, said MEMORY element switching its output states upon the simultaneous occurrence of an actuating signal to said second input means and the absence of an actuating signal to said first input means, a first NOR element operably connected to said field winding and providing an actuating signal to said first input means during each half cycle of the induced current in the field winding of opposite polarity to said predetermined polarity, a first time delay circuit connected to be fully charged upon occurrence of a predetermined number of half cycles of the induced current in the field winding of said predetermined polarity and thereafter having a decay time sufficient to keep an input signal to the first NOR element during each half cycle of polarity opposite to said predetermined polarity until the frequency of the induced current diminishes to a predetermined value, a second time delay circuit connected to maintain an input signal to the first NOR element until said first time delay circuit is fully charged, a second NOR element operably connected to said field winding providing an actuating signal to said second input means only during the intermediate region of the first half of the half cycle of induced current of opposite polarity to said predetermined polarity, and switching means responsive to the switching of output state by said MEMORY element for connecting said field winding to the excitation source.

8. In a control system for a synchronous alternating current motor having a field winding adapted to be connected to an excitation source, a MEMORY element having first and second input means, reset means, and an output means, said output means producing an output signal upon the simultaneous occurrence of an actuating signal to said second input means and the lack of an actuating signal to said first input means, a first NOR element operably connected to said field winding and providing said first input means with an actuating signal during each negative half cycle of the induced current in the field winding, a first time delay circuit connected to be fully charged upon occurrence of a number of negative half cycles of the induced current in the field winding and thereafter having a decay time sufficient to keep an input signal to the first NOR element during each positive half cycle until the frequency of the induced current diminishes to a predetermined value, a second time delay circuit connected to maintain an input signal to the first NOR element until said first time delay circuit is fully charged, a second NOR element operably connected to said field winding providing said second input means with an actuating signal only during the interval in which the magnitude of the induced current passes through the intermediate region of the first half of its negative half cycle, switching means responsive to the output signal of said output means for connecting said field winding to the excitation source, and means for providing said second input means with an actuating signal in the absence of an actuating signal from said second NOR element after a predetermined time delay.

9. In a control system for a synchronous alternating current motor having a field winding adapted to be connected to an excitation source of positive polarity, a MEMORY element having first and second input means, reset means, and an output means, said output means having an output signal upon the simultaneous occurrence of an actuating signal to said second input means and the lack of an actuating signal to said first input means, a first NOR element operably connected to said field winding and providing said first input means with an actuating signal during each negative half cycle of the induced current in the field winding, a first time delay circuit connected to be fully charged upon occurrence of a number of negative half cycles of the induced current in the field winding and thereafter having a decay time sufficient to keep an input signal to the first NOR element during each positive half cycle until the frequency of the induced current reaches to a predetermined value, a second time delay circuit connected to maintain an input signal to the first NOR element until said first time delay circuit is fully charged, a second and third NOR element, the third NOR element connected to said second input means through the second NOR element, said third NOR element operably connected to said field winding and providing an input to said second NOR element only during the positive half cycle of the induced current in the field winding, means for bypassing the third NOR element and providing an input to the second NOR element after the negative half cycle of the induced current reaches a predetermined magnitude, switching means responsive to the output signal from said output means for connecting said field winding to the excitation source, and means for providing said second input means with an actuating signal in the absence of an actuating signal from said second NOR element after a predetermined time delay.

10. In a control system for a synchronous alternating current motor having a field winding adapted to be connected to an excitation source of predetermined polarity, a MEMORY element having two output states, a reset means, and at least a first and a second input means, said MEMORY element switching its output state only upon the simultaneous occurrence of an actuating signal to said second input means and the absence of an actuating signal to said first input means, a first NOR element operably connected to said field winding and providing an actuating signal to said first input means during each half cycle of the induced current in the field winding of opposite polarity to said predetermined polarity, a first time delay circuit connected to be fully charged upon occurrence of a predetermined number of half cycles of the induced current in the field winding of said predetermined polarity and thereafter having a decay time sufficient to keep an input signal to the first NOR element during each half cycle of polarity opposite to said predetermined polarity until the frequency of the induced current diminishes to a predetermined value, a second time delay circuit connected to maintain an input signal to the first NOR element until said first time delay circuit is fully charged, a second NOR element operably connected to said field winding providing an actuating signal to said second input means only during the intermediate region of the first half of the half cycle of induced current of opposite polarity to said predetermined polarity, switching means responsive to the switching of output state by said MEMORY element for connecting said field winding to the excitation source, and means for providing said second input means with an actuating signal in the absence of an actuating signal from said second NOR element after a predetermined time delay.

11. In a control system for a synchronous alternating current motor having a field winding adapted to be connected to an excitation source of predetermined polarity, a MEMORY element having two output states, a reset means, and first second, and third input means, said MEMORY element switching its output state only upon the simultaneous occurrence of an actuating signal to said second input means and the lack of an actuating signal to said first input means or the simultaneous occurrence of an actuating signal to said third input means and the lack of an actuating signal to said first input means, a first NOR element operably connected to said field winding and providing an actuating signal to said first input means during each half cycle of the induced current in the field winding of polarity opposite to said predetermined polarity, a first time delay circuit connected to be fully charged upon occurrence of a predetermined number of half cycles of the induced current in the field winding of polarity opposite to said predetermined polarity and thereafter having a decay time sufficient to keep an input signal to the first NOR element during each half cycle of said predetermined polarity until the frequency of the induced current diminishes to a predetermined value, a second time delay circuit connected to maintain an input signal to the first NOR element until said first time delay circuit is fully charged, a second and third NOR element, said second input means connected to respond to the output of said third NOR element through the second NOR element, said third NOR element operably connected to the field winding and producing an input to said second NOR element only during the half cycle of the induced current in the field winding of said predetermined polarity, means for bypassing the third NOR element and providing an input to the second NOR element after the half cycle of the induced current of opposite polarity to said predetermined polarity reaches a predetermined magnitude, a fourth NOR element operably connected to said field winding to receive an input signal only during the half cycles of the induced current in the field winding of polarity opposite to said predetermined polarity, a third time delay circuit connected to be charged by the half cycles of the induced current of polarity opposite to said predetermined polarity and having a decay time sufficient to keep an input to the fourth NOR element during the longest half cycle of the induced current of said predetermined polarity encountered in the field winding during start-up of the motor, said fourth NOR element connected to provide an actuating signal to said third input means upon expiration of the decay time of said third time delay circuit, and switching means responsive to the change in output state of said MEMORY element for connecting said field winding to the excitation source.

12. In a control system for a synchronous alternating current motor having a field winding adapted to be connected to an excitation source, a MEMORY element having first, second and third input means and an output means, said output means providing an output signal upon the simultaneous occurrence of an actuating signal to said second input means and the lack of an actuating signal to said first input means or the simultaneous occurrence of an actuating signal to said third input means and the lack of an actuating signal to said first input means a first NOR element operably connected to said field winding and providing said first input means with an actuating signal during each negative half cycle of the induced current in the field winding, a first time delay circuit connected to be fully charged upon occurrence of a number of negative half cycles of the induced current in the field winding and thereafter having a decay time sufficient to keep an input signal to the first NOR element during each positive half cycle until the frequency of the induced current attains a predetermined value, a second time delay circuit connected to maintain an input signal to the first NOR element until said first time delay circuit is fully charged, a second and third NOR element, the third NOR element connected to said second input means through the second NOR element, said third NOR element operably connected to said field winding and providing an input to said second NOR element only during the positive half cycle of the induced current in the field winding, means for bypassing the third NOR element and providing an input to the second NOR element after the negative half cycle of the induced current reaches a predetermined magnitude, a fourth NOR element operably connected to said field winding to receive an input signal only during the negative half cycles of the induced current in the field winding, a third time delay circuit connected to be charged by the negative half cycles of the induced current and having a decay time sufficient to keep an input to the fourth NOR element during the longest positive half cycle of the induced current encountered in the field winding during start up of the motor, said fourth NOR element connected to provide an actuating signal to said third input means upon expiration of the decay time of said third time delay circuit, and switching means responsive to the output signal from said output means for connecting said field winding to the excitation source.

13. In a control system for a synchronous alternating current motor having a field winding adapted to be connected to an excitation source, speed sensing means operably connected to said field winding including a MEMORY element having an input means and an output means for initially pulsing said MEMORY element to have an output state, means for preventing the MEMORY element from reversing its initial state until the initial negative half cycle of the induced current in the field winding during starting of the motor, a NOR element operably connected to said field winding, said NOR element providing the input means with an actuating signal during each negative half cycle of the induced current in the field winding, first time delay means connected to be fully charged after a predetermined number of negative half cycles and having an adjustable decay time sufficient to keep an input to the NOR element during the positive half cycle of the induced current until the frequency of the induced current diminishes to a predetermined value, means for blocking the input from said first time delay means to the NOR element when the magnitude of the input is less than a predetermined value, a second time delay means operably connected to said field winding and connected to maintain an input to the NOR element until said first time delay means is fully charged, and switching means for connecting said field winding to the excitation source responsive to the lack of an output signal from said output means.

14. In a control system for a synchronous alternating current motor having a field winding adapted to be connected to an excitation source; means for providing a signal when the motor speed exceeds a predetermined level; means for providing narrow pulse during the occurrence of proper magnitude and polarity of the induced current in the field winding; and switching means responsive to the simultaneous occurrence of said signal and pulse for connecting said field winding to the excitation source.

15. In a control system for a synchronous alternating current motor having a field winding adapted to be connected to an excitation source; means for providing a first signal when the motor speed exceeds a predetermined level; means for providing a narrow pulse during the occurrence of proper magnitude and polarity of the induced current in the field winding; means responsive to reluctance torque synchronization of the motor for providing a second signal; and switching means responsive to the simultaneous occurrence of either the first signal and pulse or the first signal and second signal for connecting said field winding to the excitation source.

16. In a control system for a synchronous alternating current motor having a field winding adapted to be connected to an excitation source; a MEMORY element having an output dependent on a proper combination of inputs to the MEMORY element; pulse network means for initially setting said MEMORY element to a proper output state; means for providing a first input to said MEMORY element when the motor speed exceeds a predetermined level; means for providing a second input of short duration during the occurrence of proper magnitude and polarity of the induced current in the field winding; means responsive to reluctance torque synchronization of the motor for providing a third input to said MEMORY element; the proper combination of inputs to switch outputs states of said MEMORY element being of the first input with the second input or the first input with the third input; and switching means responsive to the change in output state of said MEMORY element for connecting said field winding to the excitation source.

17. In a control system for a synchronous alternating current motor having a rotor and stator poles and a field minding adapted to be connected to an excitation source; a field discharge resistor; means arranged to short circuit the field winding through said field discharge resistor when the motor is starting; means for developing across part of said field discharge resistor an input signal indicating the motor operating condition; voltage clipping network means for limiting the magnitude of the input signal and having a constant voltage output signal whose frequency varies with motor speed; means responsive to the instantaneous value of said output signal for indicating the relative position of the rotor and stator poles; means responsive to the frequency of said output signal for indicating the motor speed; and switching means responsive to a selected indication of said position and said speed for disconnecting said field discharge resistor from the field winding and thereafter connecting said field winding to the excitation source.

References Cited in the file of this patent
UNITED STATES PATENTS

| | | |
|---|---|---|
| 2,530,997 | Schaelchlin | Nov. 21, 1950 |
| 2,914,718 | Baude | Nov. 24, 1959 |